United States Patent [19]
Bhatia et al.

[11] Patent Number: 6,099,890
[45] Date of Patent: Aug. 8, 2000

[54] COOKING FAT AND METHOD OF MAKING

[75] Inventors: Rajni Bhatia; Marcelle van der Kommer, both of Vlaardingen, Netherlands

[73] Assignee: Thomas J. Lipton Co., division of Conopco, Inc., Englewood Cliffs, N.J.

[21] Appl. No.: 09/010,732

[22] Filed: Jan. 22, 1998

[30] Foreign Application Priority Data

Jan. 22, 1997 [EP] European Pat. Off. .............. 97200173

[51] Int. Cl.[7] ...................................................... A23D 9/00
[52] U.S. Cl. ............................................ 426/608; 426/601
[58] Field of Search ...................................... 426/608, 601

[56] References Cited

U.S. PATENT DOCUMENTS

| | | | |
|---|---|---|---|
| 2,875,067 | 2/1959 | Holman | 426/608 |
| 3,189,465 | 6/1965 | Oakley | 49/122 |
| 4,260,643 | 4/1981 | Cochran | 426/608 |
| 4,366,181 | 12/1982 | Dijkshoorn | 426/607 |
| 4,948,618 | 8/1990 | Hirokawa | 426/608 |
| 4,954,362 | 9/1990 | Desdorp | 426/602 |

FOREIGN PATENT DOCUMENTS

| | | |
|---|---|---|
| 8905535 | 11/1992 | Czechoslovakia . |
| 477825 A3 | 4/1992 | European Pat. Off. . |
| 351142 | 1/1905 | France . |
| 54-083910 | 4/1979 | Japan . |
| 59-042842 | 3/1984 | Japan . |
| 59-156242 | 5/1984 | Japan . |
| 59-156242 | 9/1984 | Japan . |

OTHER PUBLICATIONS

Peredi 1997 Characteristics of Conventional and High Oleic Sunflower Oils–Palm Olein Blends and Palm Oil–Lard Blends Oils & Fats in Food Applications:Proceedings of the Food Application Session of the 23rd World Confers. of the ISF Sep. 1997 p 1–8.

Lo and Handel 1983 J AOCS 60(4) 815.

Hui 1996 Baileys Industrial Oil and Fat Products 5th Eedition, vol. 2 p 278, 279, 286, 287,378, 383 Wiley Interscience Publications New York.

Hui 1996 Baileys Industrial Oil and Fat Products 5th Edition, vol. 1,p 4, 5, 15 Wiley Interscience Publications New York.

European Search Report Application No. EP 9/20,0173 dated Jul. 7, 1997.

*Primary Examiner*—Carolyn Paden

[57] ABSTRACT

The invention relates to a lard-like product comprising more than 95 wt % of fats, said fats containing 1–75 wt % of lard and 25–99 wt % of other fats, whereby the SAFA content of the fat blend is equal to or less than 35 wt % and the N20 of the fat blend is from 10 or more.

11 Claims, No Drawings

COOKING FAT AND METHOD OF MAKING

BACKGROUND OF THE INVENTION

The invention relates to a cooking fat, in particular a cooking fat which has the product attributes of lard and a process for making such products.

Lard is a well known cooking fat which is very popular in a number of countries around the world. Especially in Eastern Europe lard is a popular cooking fat. Lard originates from the fatty parts of the pork and is usually obtained via wet or dry rendering or pressing. Pressed lard which is made in an industrial process, often has a white colour. Home made lard is usually obtained by the dry-rendered method.

A disadvantage of using lard is the high level of saturated fatty acids (SAFA level) in the material. Typically the SAFA level of lard can be from 30–48 wt % although mostly the SAFA level of lard is from 35 to 45 wt %. High SAFA levels in the diet have been associated with an increased risk of coronary heart diseases and an increased cholesterol level. Therefore there is an obvious desire for more healthy cooking fats, with a lower saturated fatty acid content.

Low SAFA cooking oils are well-known e.g. olive oil. These oils typically have low SAFA levels. A disadvantage of these materials however is that they are liquid and hence have a completely different appearance, smell, taste and cooking behaviour as lard.

Solid fat compositions comprising lard have been described, but these compositions are either not grainy or have a high saturated. fatty acid content. In addition known compositions are often refined and are therefore tasteless and flavourless.

U.S. Pat. No. 2,875,067 discloses shortenings made from lard by a process which includes directed interesterification of the lard triglycerides, followed by hydrogenation.

U.S. Pat. No. 1,135,351 describes a lard-like product made from cotton seed oil. The cotton seed oil is partially hydrogenated and hardened to a homogeneous white or yellowish semi-solid, which simulates lard.

JP 55/096,057 describes an edible oil containing lard and corn oil. This product maintains the preferred taste of corn oil. This product is a liquid oil composition and does not have a pasty lard-like consistency.

SUMMARY OF THE INVENTION

The present invention aims at providing a lard-like product which is significantly lower in SAFA level than lard, but on the other hand is lard-like in that it is pasty rather than being liquid, has a grainy structure and resembles lard in taste, cooking behaviour and smell.

It has been found that this lard like product can be obtained if a specific mixture of lard and other fats is used.

Accordingly in a first embodiment the invention relates to a lard-like product comprising more than 90 wt % of fats, said fats containing 1–75 wt % of lard and 25–99 wt % of other fats, whereby the SAFA content of the fat blend is equal to or less than 35 wt %, preferably less than 30 wt %, most preferred less than 28 wt %, and the N20 of the fat blend is equal to or more than 10.

DETAILED DESCRIPTION OF THE INVENTION

JP-A-55/23974 describes a mixture of lard and other fats for producing a shortening. Most of the lard component, however is co-randomised prior to incorporation into the mixture.

For the purpose of the present invention the term lard refers to substantially non-modified lard. Fatty components originating from lard e.g. by co-randomisation are not embraced within this term.

The lard-like product of the invention comprises at least 90 wt % of fats. Preferably lard-like products of the invention are substantially free of water e.g the water level is less than 7 wt %, more preferred less than 4 wt %, most preferred less than 1 wt %.

The fat for use in the lard-like products of the invention contain from 1–75 wt % of lard. This lard can be obtained from fatty tissue of the pork by any suitable method e.g. melting, pressing etc. Preferably the lard is obtained by dry rendering. Preferably the lard level is less than 65 wt %, conveniently between 20 and 65 wt %.

The other components of the fat in the lard-like product can be selected from a wide range of fats and mixtures thereof. A prerequisite of the other fats is that together they contain relatively low levels of SAFA in order to obtain a SAFA content of the total product of less than 35 wt %, preferably less than 30 wt %. Another pre-requisite, however is that the mixture of the other fat components and the lard has an N20 of 10 or more.

For the purpose of the invention these two criteria can be met by selecting the appropriate type of other fat(s). Applicants have found that a particularly useful blend of other fats is a mixture of a substantially liquid oil and a relatively hard oil component. These blends allow the use of relatively low levels of lard, say from 1 to 45 wt % while still obtaining the desired product properties.

The liquid oil in such a mixture can be any oil which is liquid at ambient temperature, for example rapeseed oil, safflower oil, sunflower oil, soybean oil, olive oil, fish oil, walnut oil, sesame oil etc. Preferably the liquid oil contains 25 wt % or less of SAFA, more preferred less than 20 wt %, most preferred less than 10 wt %.

The level of liquid oil in the composition may vary in a broad range, preferably, however the level of liquid oil is from 30–60 wt %, most preferred 40 to 55 wt %.

The relatively hard oil component can be any component which is capable—despite the presence of the liquid oil in the mixture—to provide a relatively high N20, without unnecessarily raising the SAFA content and such that the final blend is capable of forming a grainy product. Examples of suitable oils or fats are palm oil, palmkernel oil, coconut oil, shea, illipe, cocoa butter. Also hardened fractions of these fats may be used or hard fractions of other fats. For the purpose of the invention especially preferred is the use of palm oil, cocoa butter or fractions thereof. Also mixtures of these components may be use. Preferably if palm oil, palmkernel oil, coconut oil, shea, illipe, cocoa butter or hardened versions or fractions thereof are present, their total level is from >0–40 wt %, more preferred 5–35 wt %, generally from 5 to 25 wt %. Palm oil or fractions thereof are especially preferred. Examples of other suitable systems are given in the examples.

As explained above graininess is an important property of the final product. This graininess, preferably evidenced by the presence of roundish fat particles having an number average diameter of 0.2 to 1.5 mm, more preferred 0.3 to 1.0 mm is very preferred by consumers as they see this as an important element of the lard-like structure.

Graininess can be caused by various methods, for example selection of appropriate fat blends and method of processing.

With reference to the selection of fat blends applicants have found that a particular mixture of symmetric and asymmetric fats provides particularly good graininess.

This selection is characterised by the following equations:
(a) If the ratio of symmetric to asymmetric fats is >3, then the product is grainy if the content of symmetric fats is >3.5 wt %.
(b) if the ratio of symmetric to asymmetric fats is <3, then a grainy product is obtained if the amount of symmetric fats (Sym) plus the amount of asymmetric fats (ASym) is >−4*(Sym/ASym)+15

Whereby:

The triglycerides are abbreviated as follows in terms of their fatty acids:

P is Palmitic acid,
S is Stearic acid,
O is oleic acid
Sym is the total weight percentage of symmetric fats namely: POS, SOS, POP;
ASym is the total weight percentage of asymmetric fats namely: SPO, PSO, SSO and PPO Preferred fats containing high levels of symmetric triglycerides are palm oil, mid- or stearin fractions thereof and cocoa butter, also mixtures of these components can advantageously be used.

The lard-like products of the invention have a SAFA level of equal to or less than 35 wt %, preferably less than 30 wt %, very preferably the SAFA level is less than 28 wt %, most preferred less than 26%. Generally the SAFA level will be above 15 wt %, e.g. more than 20 wt %.

The lard-like products of the invention preferably have a N20 of between 10 and 35%. Preferably the N20 is between 15 and 30%, more preferred between 15 and 25%. The N value can be measured by any suitable technique for example as described in Fette, Seife, Anstrichmittel 80, 180–186 (1978).

In another embodiment, the N20 is preferably between 10 and 15%.

Lard-like products according to the invention can optionally contain further ingredients for example flavouring, herbs, salt, colouring, anti-spattering agents, vitamins, and other additives. Preferably a lard-like flavour is added.

Lard-like products of the invention can be made by any convenient process, for example the various components can be mixed for example after melting, followed by cooling. When desired shear may be applied to the product during cooling.

In a preferred process shear is applied during cooling.

The invention will now be illustrated by the following non-limiting examples.

EXAMPLE I

A lard-like product of the following composition was made by mixing the ingredients at 45° C. followed by quiescently cooling.

| Ingredient | parts by weight |
| --- | --- |
| lard | 22 |
| rapeseed oil | 47 |
| palmoil | 30 |
| flavour | 1 |

The product had a grainy lard like texture and a lard like taste. The $N_{20}$ can conveniently be measured in line with Fette, Seife, Anstrichmittel 80, 180–186 (1978) with the following modifications: the samples are stabilised at 0° C. for 16 hours and tempered as described for ½ hour at the respective measuring temperatures.

$N_{20}$=11%
SAFA content: 28%

According to the formula presented above if the ratio of symmetric to asymmetric fats is <3, then a grainy product is obtained if the amount of symmetric fats (Sym) plus the amount of asymmetric fats (ASym) is >−4*(Sym/ASym)+15

The ratio of symmetric to asymmetric fats in the composition according to example 1 is 1.5.

The amount of symmetric plus asymmetric fatty acids is 19.7

$$-4*(Sym/ASym)+15=9,$$

Therefore the composition according to example 1 satisfies the formula presented above. Based on that the composition according to example 1 is grainy. The graininess is also visible by eye on an open broken surface of the product, for example when you take out a sample from the product with a spoon.

EXAMPLE II

The following lard-like products (in parts by weight) were made by mixing the ingredients at 55° C. followed by cooling in a scraped surface heat exchanger

| Ingredient | A | B | C | D | E | F | G |
| --- | --- | --- | --- | --- | --- | --- | --- |
| lard | 60 | 28 | 38 | 38 | 38 | 37 | 38 |
| rapeseed oil | 40 | 52 | 51 | 46 | 42 | 43 | 46 |
| palmoil |  | 15 |  | 10 |  | 20 | 10 |
| cocoa butter |  |  |  |  | 20 |  |  |
| PO/PK* |  | 5 |  |  |  |  |  |
| PO** |  |  | 11 |  |  |  | 6 |
| PO*** |  |  |  | 6 |  |  |  |
| RP**** |  |  |  |  |  |  |  |

To samples B-G 0.01–0.05 parts by weight of lard flavour was added.
Notes:
PO/PK* interesterified mixture of 50 wt % fully hardened palm oil and 50 wt % of fully hardened palm kernel oil
PO** the stearin fraction of palmoil obtained by dry fractionation (C16 = 61)
PO*** the mid-fraction of palmoil obtained by wet fractionation (C16 = 57)
RP**** fully hardened rape seed oil The products had a grainy lard-like texture and taste, despite the fact that they had a significantly lower SAFA content.

Furthermore all compositions satisfy the formula for grainy products as indicated above.

Characterisation of the products:

TABLE I

| | product characteristics | | | | |
| --- | --- | --- | --- | --- | --- |
| example | SAFA content (wt %) | N20 (%) | Sym/ Asym | Sym + Asym | −4*(Sym/Asym) + 15 |
| A | 27 | 12 | 0.1 | 16.2 | 14.6 |
| B | 28 | 9 | 0.61 | 13.5 | 12.6 |
| C | 26 | 13 | 0.56 | 13.4 | 12.76 |
| D | 28 | 13 | 0.8 | 17.5 | 11.8 |
| E | 31 | ND* | 2.0 | 25.1 | 6.9 |
| F | 28 | 11 | 0.67 | 16.9 | 12.3 |
| G | 28 | 11 | 0.45 | 15.5 | 13.2 |

*ND: not determined

What is claimed is:

1. A lard-like product comprising a mixture of more than 90 wt % of fats, said fats containing 1–75 wt % of lard and 25–99 wt % of other fats, said other fats comprising 30–60 wt % of a substantially liquid oil, whereby the saturated fatty acid (SAFA) content of the total fat blend is equal to or less than 35 wt % and the N20 of the fat blend is 10 or more.

2. A lard-like product according to claim 1 whereby the SAFA content of the total fat blend is equal to or less than 30 wt %.

3. A lard-like product according to claim 1, wherein the lard is obtained from pork by dry rendering.

4. A lard-like product according to claim 1, wherein the other fats are a mixture of substantially liquid oil and a relatively hard oil component.

5. A lard-like product according to claim 4, comprising 40 to 55 wt % of liquid oil.

6. A lard-like product according to claim 4, comprising a liquid oil selected from the group of rapeseed oil and sunflower oil.

7. A lard-like product according claim 4, comprising a relatively hard oil component at a level of 5 to 35 wt %.

8. A lard-like product according to claim 4, comprising a relatively hard oil selected from the group of cocoa butter, palmoil or fractions thereof.

9. A lard-like product according claim 1 having a grainy texture as evidenced by the presence of fat particles having a number average size of from 0.2 to 1.5 mm.

10. A lard-like product according to claim 1, whereby the fat blend composition of the product satisfies one of the following equations:

(a) if the ratio of symmetric to asymmetric fats is >3, then the content of symmetric fats is >3.5 wt %, (b) if the ratio of symmetric to asymmetric fats is <3, the amount of symmetric fats (Sym) plus the amount of asymmetric fats (ASym) is $>-4*(Sym/ASym)+15$.

11. A method of producing a lard-like product comprising mixing the fats of claim 1 in a molten state and then cooling the mixture.

* * * * *